US012608942B2

(12) United States Patent
Zhu et al.

(10) Patent No.: US 12,608,942 B2
(45) Date of Patent: \*Apr. 21, 2026

(54) OBSTACLE RECOGNITION METHOD AND APPARATUS, DEVICE, MEDIUM AND WEEDING ROBOT

(71) Applicant: SUZHOU CLEVA PRECISION MACHINERY & TECHNOLOGY CO., LTD., Suzhou (CN)

(72) Inventors: Shaoming Zhu, Suzhou (CN); Xue Ren, Suzhou (CN)

(73) Assignee: Suzhou Cleva Precision Machinery & Technology Co., Ltd., Suzhou (CN)

( * ) Notice: Subject to any disclaimer, the term of this patent is extended or adjusted under 35 U.S.C. 154(b) by 229 days.

This patent is subject to a terminal disclaimer.

(21) Appl. No.: 18/252,113

(22) PCT Filed: Nov. 27, 2020

(86) PCT No.: PCT/CN2020/132075
§ 371 (c)(1),
(2) Date: May 8, 2023

(87) PCT Pub. No.: WO2022/095161
PCT Pub. Date: May 12, 2022

(65) Prior Publication Data
US 2024/0013540 A1 Jan. 11, 2024

(30) Foreign Application Priority Data
Nov. 9, 2020 (CN) .......................... 202011242357.2

(51) Int. Cl.
*G06V 20/50* (2022.01)
*A01B 69/00* (2006.01)
(Continued)

(52) U.S. Cl.
CPC ............ *G06V 20/50* (2022.01); *A01B 69/001* (2013.01); *A01B 69/008* (2013.01); *A01M 21/00* (2013.01);
(Continued)

(58) Field of Classification Search
CPC ........ G06V 20/50; G06V 10/44; G06V 10/56; G06V 20/58; G06V 10/26; A01B 69/001;
(Continued)

(56) References Cited

U.S. PATENT DOCUMENTS

| | | | | |
|---|---|---|---|---|
| 2011/0135147 A1* | 6/2011 | Eswara | ..................... | G06T 7/11 |
| | | | | 382/199 |
| 2015/0071540 A1* | 3/2015 | Schepelmann | ...... | A01D 34/008 |
| | | | | 382/173 |
| 2018/0084708 A1* | 3/2018 | Neitemeier | .......... | A01B 69/001 |

FOREIGN PATENT DOCUMENTS

| | | |
|---|---|---|
| CN | 106155053 A | 11/2016 |
| CN | 107454969 A | 12/2017 |

(Continued)

OTHER PUBLICATIONS

International Search Report for Application No. PCT/CN2020/132075, dated Aug. 16, 2021.

*Primary Examiner* — Amandeep Saini
*Assistant Examiner* — Denise G Alfonso
(74) *Attorney, Agent, or Firm* — JK Intellectual Property Law, PA

(57) ABSTRACT

An obstacle recognition method includes determining a candidate obstacle region in a candidate weeding region image according to color information of the candidate weeding region image; obtaining contour information of the candidate obstacle region and chrominance information and value information of the candidate weeding region image; and determining, according to the contour information and the chrominance information, or the contour information, (Continued)

Determine a candidate obstacle region in a candidate weeding region image according to color information of the candidate weeding region image — 210

Obtain contour information of the candidate obstacle region and value information of the candidate weeding region image, and obtain a minimum chrominance segmentation value and a maximum chrominance segmentation value of the candidate weeding region image according to the color information of the candidate weeding region image — 220

If the minimum chrominance segmentation value is less than a first preset chrominance segmentation threshold and the maximum chrominance segmentation value is greater than a second preset chrominance segmentation threshold, determine, according to the contour information and first preset information determination conditions, or the contour information, the value information, and first preset information determination conditions, whether there is an obstacle in the candidate weeding region image — 230

If the minimum chrominance segmentation value is greater than or equal to the first preset chrominance segmentation threshold or the maximum chrominance segmentation value is less than or equal to the second preset chrominance segmentation threshold, determine, according to the contour information and second preset information determination conditions, or the value information and second preset information determination conditions, whether there is an obstacle in the candidate weeding region image — 240 the chrominance information, and the value information, whether there is an obstacle in the candidate weeding region image. A related obstacle recognition apparatus, electronic device, computer-readable storage medium, and weeding robot are also disclosed.

7 Claims, 2 Drawing Sheets

(51) Int. Cl.

| | | |
|---|---|---|
| *A01B 69/04* | (2006.01) | |
| *A01M 21/00* | (2006.01) | |
| *G06T 7/13* | (2017.01) | |
| *G06T 7/155* | (2017.01) | |
| *G06T 7/90* | (2017.01) | |
| *G06V 10/44* | (2022.01) | |
| *G06V 10/56* | (2022.01) | |

(52) U.S. Cl.
CPC ................. *G06T 7/13* (2017.01); *G06T 7/155* (2017.01); *G06T 7/90* (2017.01); *G06V 10/44* (2022.01); *G06V 10/56* (2022.01); *G06T 2207/10024* (2013.01); *G06T 2207/20021* (2013.01); *G06T 2207/20036* (2013.01)

(58) Field of Classification Search
CPC ...... A01B 69/008; A01B 39/18; A01M 21/00; G06T 7/13; G06T 7/155; G06T 7/90; G06T 2207/10024; G06T 2207/20021; G06T 2207/20036; A01D 34/008
See application file for complete search history.

(56) References Cited

FOREIGN PATENT DOCUMENTS

| CN | 111413977 A | 7/2020 |
|---|---|---|
| CN | 111830988 A | 10/2020 |

* cited by examiner

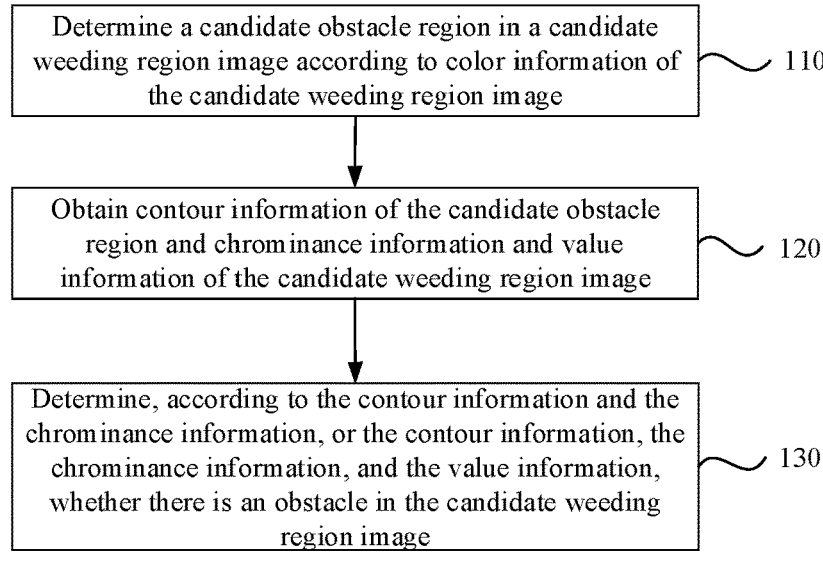

Determine a candidate obstacle region in a candidate weeding region image according to color information of the candidate weeding region image ~ 110

Obtain contour information of the candidate obstacle region and chrominance information and value information of the candidate weeding region image ~ 120

Determine, according to the contour information and the chrominance information, or the contour information, the chrominance information, and the value information, whether there is an obstacle in the candidate weeding region image ~ 130

FIG. 1

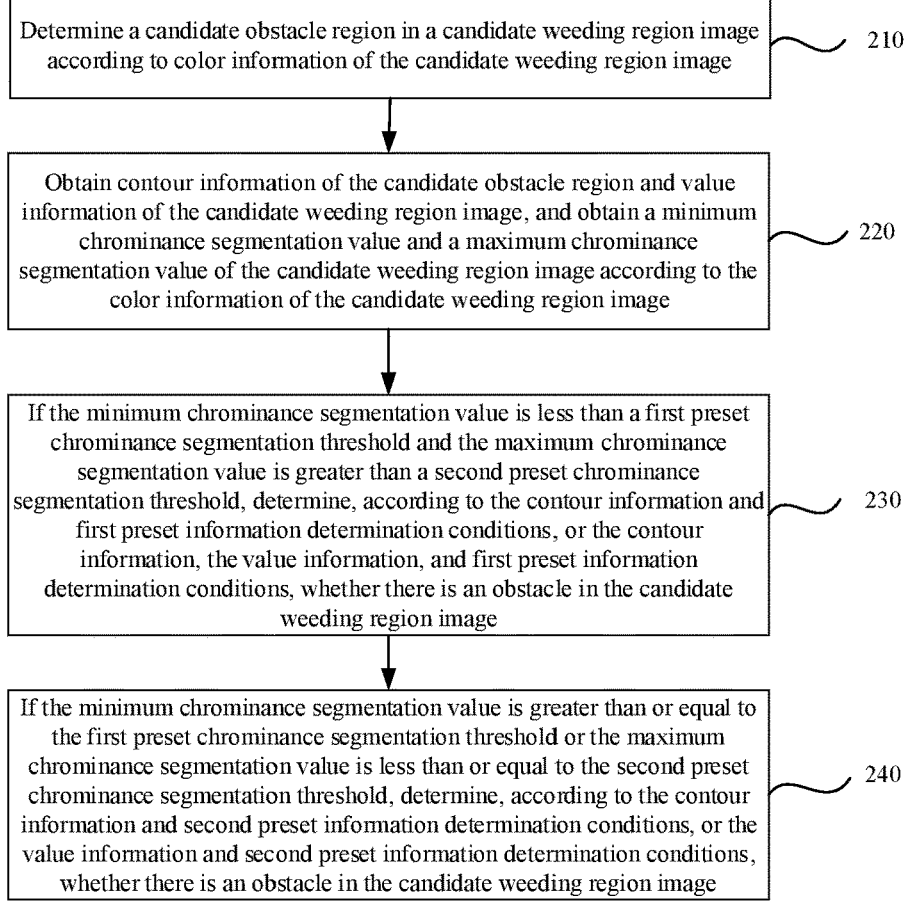

Determine a candidate obstacle region in a candidate weeding region image according to color information of the candidate weeding region image ~ 210

Obtain contour information of the candidate obstacle region and value information of the candidate weeding region image, and obtain a minimum chrominance segmentation value and a maximum chrominance segmentation value of the candidate weeding region image according to the color information of the candidate weeding region image ~ 220

If the minimum chrominance segmentation value is less than a first preset chrominance segmentation threshold and the maximum chrominance segmentation value is greater than a second preset chrominance segmentation threshold, determine, according to the contour information and first preset information determination conditions, or the contour information, the value information, and first preset information determination conditions, whether there is an obstacle in the candidate weeding region image ~ 230

If the minimum chrominance segmentation value is greater than or equal to the first preset chrominance segmentation threshold or the maximum chrominance segmentation value is less than or equal to the second preset chrominance segmentation threshold, determine, according to the contour information and second preset information determination conditions, or the value information and second preset information determination conditions, whether there is an obstacle in the candidate weeding region image ~ 240

FIG. 2

OBSTACLE RECOGNITION METHOD AND APPARATUS, DEVICE, MEDIUM AND WEEDING ROBOT

CROSS-REFERENCE TO RELATED PATENT APPLICATIONS

This application is a national stage of International Application No. PCT/CN2020/132075, filed on Nov. 27, 2020, which claims priority to CN patent application No. 202011242357.2, filed on Nov. 9, 2020. All of the aforementioned applications are hereby incorporated by reference in their entireties.

TECHNICAL FIELD

Embodiments of the present invention relate to an image processing technology, in particular to an obstacle recognition method and apparatus, a device, a medium, and a weeding robot.

BACKGROUND

With the improvement of living standards, people are increasingly paying attention to environmental construction, so the construction of urban green gardens is receiving increasing attention. Meanwhile, efficient green maintenance, such as daily weeding, has gradually become a demand. However, manual control is required for conventional weeding machines, so weeding robots with autonomous working functions are gradually emerging.

In existing technologies, boundary wires are generally buried to calibrate boundaries of a weeding region for a weeding robot and consequently a lot of manpower and material resources are consumed and costs are increased. In addition, due to limitations on the burying of boundary wires, for example, corners should not be less than 90 degrees, a shape of the weeding region is limited to some extent.

SUMMARY

Embodiments of the present invention provide an obstacle recognition method and apparatus, a device, a medium, and a weeding robot to improve recognition efficiency and accuracy of obstacles in a candidate weeding region for a weeding robot.

In a first aspect, an embodiment of the present invention provides an obstacle recognition method. The method includes:

determining a candidate obstacle region in a candidate weeding region image according to color information of the candidate weeding region image;

obtaining contour information of the candidate obstacle region and chrominance information and value information of the candidate weeding region image; and determining, according to the contour information and the chrominance information, or the contour information, the chrominance information, and the value information, whether there is an obstacle in the candidate weeding region image.

In a second aspect, an embodiment of the present invention further provides an obstacle recognition apparatus. The apparatus includes:

a candidate obstacle region determination module, configured to determine a candidate obstacle region in a candidate weeding region image according to color information of the candidate weeding region image;

an information obtaining module, configured to obtain contour information of the candidate obstacle region and chrominance information and value information of the candidate weeding region image; and an obstacle determination module, configured to determine, according to the contour information and the chrominance information, or the contour information, the chrominance information, and the value information, whether there is an obstacle in the candidate weeding region image.

In a third aspect, an embodiment of the present invention further provides an electronic device. The electronic device includes:

one or more processors; and a storage apparatus, configured to store one or more programs, where when the one or more programs are executed by the one or more processors, the one or more processors are enabled to implement the foregoing obstacle recognition method.

In a fourth aspect, an embodiment of the present invention further provides a computer-readable storage medium storing a computer program. When the program is executed by a processor, the foregoing obstacle recognition method is implemented.

In a fifth aspect, an embodiment of the present invention further provides a weeding robot, including a robot body and the foregoing electronic device.

According to the embodiments of the present invention, a candidate obstacle region in a candidate weeding region image is determined according to color information of the candidate weeding region image; contour information of the candidate obstacle region and chrominance information and value information of the candidate weeding region image are obtained; and whether there is an obstacle in the candidate weeding region image is determined according to the contour information and the chrominance information, or the contour information, the chrominance information, and the value information. Thus, problems in existing technologies that boundary wires are generally buried to calibrate a boundary of a weeding region for a weeding robot and consequently a lot of manpower and material resources are consumed and costs are increased are solved. In addition, a problem that a shape of the weeding region is limited to some extent due to limitations on the burying of boundary wires is solved. The present invention improves recognition efficiency and accuracy of obstacles in the candidate weeding region for the weeding robot.

BRIEF DESCRIPTION OF THE DRAWINGS

FIG. 1 is a flowchart of an obstacle recognition method provided in Embodiment 1 of the present invention;

FIG. 2 is a flowchart of an obstacle recognition method provided in Embodiment 2 of the present invention;

DETAILED DESCRIPTION OF THE EMBODIMENTS

Figure 3:
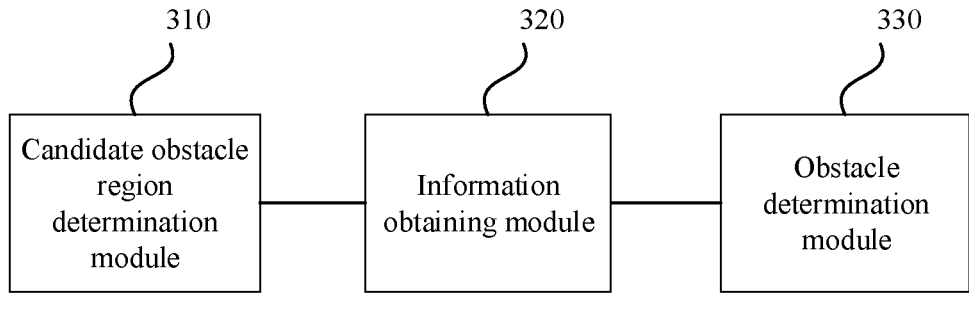
FIG. 3 is a schematic structural diagram of an obstacle recognition apparatus provided in Embodiment 3 of the present invention.

The present invention will be further described in detail below with reference to the accompanying drawings and embodiments. It should be appreciated that the specific embodiments described here are merely used for explaining the present invention, rather than limiting the present invention. In addition, it should be noted that, for the ease of description, only the parts related to the present invention, not all structures, are shown in the accompanying drawings.

Embodiment 1

FIG. 1 is a flowchart of an obstacle recognition method provided in Embodiment 1 of the present invention. This embodiment may be applied to a situation where a weeding robot recognizes obstacles in a candidate weeding region. The method may be performed by an obstacle recognition apparatus provided in an embodiment of the present invention, and the apparatus may be implemented by software and/or hardware. With reference to FIG. 1, the obstacle recognition method provided in this embodiment includes:

Step 110: Determine a candidate obstacle region in a candidate weeding region image according to color information of the candidate weeding region image.

A candidate weeding region is a region in which a weeding robot may work and in which all weeds may be about to be removed, namely, a weeding region. The candidate weeding region may alternatively be an obstacle region which does not have a significant color difference from a lawn or in which obstacles are very small and disorderly.

The candidate weeding region image may be captured by a camera installed on the weeding robot, which is not limited in this embodiment. The color information of the candidate weeding region image may include information such as Hue, Saturation, and Value of the image, which is not limited in this embodiment. A probable obstacle region is determined from the candidate weeding region image through the color information. For example, the region significantly different from the surrounding in color in the image is determined as a candidate obstacle region according to the color information.

In this embodiment, optionally, the determining a candidate obstacle region in a candidate weeding region image according to color information of the candidate weeding region image includes:

obtaining a color segmentation image of the candidate weeding region image according to the color information of the candidate weeding region image; and morphologically processing the color segmentation image, and determining a region with a preset color as the candidate obstacle region from the morphologically processed color segmentation image.

With regard to obtaining a color segmentation image of the candidate weeding region image according to the color information of the candidate weeding region image, color segmentation may be performed through dynamic color segmentation, edge texture method segmentation, fixed threshold segmentation, Otsu threshold segmentation, or the like to obtain the color segmentation image of the candidate weeding region image. The color segmentation image may be a binary image. The color segmentation image is further morphologically processed, where the morphological processing may be an inverse operation, an open operation, a close operation, or the like, which is not limited in this embodiment.

The region with a preset color is determined as the candidate obstacle region from the morphologically processed color segmentation image. For example, a black region is used as a weeding region, and a white region is used as a candidate obstacle region for further recognition. The color segmentation image is obtained for preliminary segmentation of the candidate weeding region, and is morphologically processed to improve accuracy of determining the candidate obstacle region.

Step 120: Obtain contour information of the candidate obstacle region and chrominance information and value information of the candidate weeding region image.

The contour information is contour information of a single candidate obstacle region, and may be obtained through contour detection on the candidate obstacle region. The contour information may include position information and range information.

The range information is used to represent a size of the candidate obstacle region, which may be area, diagonal length, width, height, number of pixels, or the like. This is not limited in the embodiment.

The position information is used to display the distance between the candidate obstacle region and the weeding robot, for example, a y-axis coordinate value at a bottom right corner of a minimum bounding rectangle of the candidate obstacle region, or another representative coordinate value, which is not limited in this embodiment. Processing on candidate obstacle regions that are too far or too small may be avoided through the position information and the range information.

The chrominance information of the candidate weeding region image is an overall chrominance feature of the candidate weeding region image. The chrominance information of the candidate weeding region image is combined with the contour information of the candidate obstacle region to jointly determine whether the candidate obstacle region is an obstacle region.

The value information of the candidate weeding region image is overall value information of the candidate weeding region image, and a value channel image of the candidate weeding region image may be obtained to obtain information related to a value in the image. A relationship between the candidate obstacle region and lighting is determined through the value information.

In this embodiment, optionally, the contour information includes roughness information.

Determining the roughness information includes:

obtaining a value channel image of the candidate weeding region image;

performing edge extraction on the value channel image to obtain an edge image; and determining the roughness information according to gray values of pixels in edge information of the edge image.

The roughness information is used to display roughness of edges of the candidate obstacle region, which may be an average roughness. The average roughness may be calculated by dividing a sum of roughness of pixels in the obstacle region within the contour by a total number of pixels in the obstacle region within the contour. This is not limited in the embodiment.

Channel separation is performed on the candidate weeding region image to obtain the value channel image of the candidate weeding region image. Optionally, the value channel image is pre-processed, including filtration, normalization, and the like, which is not limited in this embodiment. Edge extraction is performed on the pre-processed value channel image to obtain the edge image. A canny operator may be used for the edge extraction to improve accuracy of obtaining the edge information in the edge image.

The roughness information of the candidate obstacle region is determined through the edge information in the edge image of the corresponding position of the candidate obstacle region, where the edge information includes gray values of pixels in the contour of the candidate obstacle region. When the roughness information is an average roughness, the average roughness of the edges of the candidate obstacle region may be obtained by dividing the number of pixels with a gray value of the obstacle region equal to 255 in the contour by the total number of pixels of the obstacle region in the contour.

The roughness information is determined through the gray values of the pixels in the edge information of the edge image, which improves the accuracy of obtaining the roughness information, thereby improving the accuracy of obstacle recognition.

Step 130: Determine, according to the contour information and the chrominance information, or the contour information, the chrominance information, and the value information, whether there is an obstacle in the candidate weeding region image.

The contour information of the candidate obstacle region and the chrominance information of the candidate weeding region image are compared with preset information determination conditions, or the contour information, the chrominance information, and the value information are compared with preset information determination conditions. The preset information determination conditions are related to the contour information and the chrominance information. If the preset information determination conditions are satisfied, the candidate obstacle region is determined as an obstacle region, that is, there is an obstacle in the candidate weeding region image where the obstacle region is located, so that the weeding robot performs subsequent obstacle processing.

For example, the recognized obstacle is an obstacle having a color similar to a lawn.

In this embodiment, optionally, the value information includes: the number of exposed pixels and the number of non-exposed white pixels.

The number of exposed pixels is the number of pixels in the candidate weeding region image that are in an exposed state. The number of non-exposed white pixels is the number of pixels in the candidate weeding region image that are not in the exposed state but appear white, such as pixels of white obstacles in the candidate weeding region image.

The number of exposed pixels may be obtained according to the values of pixels in the candidate weeding region image. A way of obtaining may include obtaining the value channel image of the candidate weeding region image, and collecting statistics on the number of pixels with values greater than or equal to a preset threshold, such as 255, as the number of exposed pixels.

The number of non-exposed white pixels is obtained according to the values and chrominances of pixels in the candidate weeding region image. A way of obtaining may include obtaining the value channel image and chrominance channel image of the candidate weeding region image, and collecting statistics on the number of pixels with values less than the preset threshold, such as 255, in the value channel image and chrominances less than or equal to a preset threshold, such as 0, in the chrominance channel image, as the number of non-exposed white pixels.

The value information is combined with the contour information and the chrominance information to jointly determine whether there is an obstacle in the candidate weeding region image, so as to improve accuracy of obstacle recognition.

According to the technical solution provided in this embodiment, a candidate obstacle region in a candidate weeding region image is determined according to color information of the candidate weeding region image; contour information of the candidate obstacle region and chrominance information and value information of the candidate weeding region image are obtained; and whether there is an obstacle in the candidate weeding region image is determined according to the contour information and the chrominance information, or the contour information, the chrominance information, and the value information. Thus, problems in existing technologies that boundary wires are generally buried to calibrate a boundary of a weeding region for a weeding robot and consequently a lot of manpower and material resources are consumed and costs are increased are solved. In addition, a problem that a shape of the weeding region is limited to some extent due to limitations on the burying of boundary wires is solved. The present invention improves recognition efficiency and accuracy of obstacles in the candidate weeding region for the weeding robot.

Embodiment 2

FIG. 2 is a flowchart of an obstacle recognition method provided in Embodiment 2 of the present invention. This technical solution supplements the process of determining, according to the contour information and the chrominance information, or the contour information, the chrominance information, and the value information, whether there is an obstacle in the candidate weeding region image. Compared with the foregoing solution, this solution is specifically optimized as follows: the determining, according to the contour information and the chrominance information, or the contour information, the chrominance information, and the value information, whether there is an obstacle in the candidate weeding region image includes:

if a minimum chrominance segmentation value is less than a first preset chrominance segmentation threshold and a maximum chrominance segmentation value is greater than a second preset chrominance segmentation threshold, determining, according to the contour information and first preset information determination conditions, or the contour information, the value information, and first preset information determination conditions, whether there is an obstacle in the candidate weeding region image; or if the minimum chrominance segmentation value is greater than or equal to the first preset chrominance segmentation threshold or the maximum chrominance segmentation value is less than or equal to the second preset chrominance segmentation threshold, determining, according to the contour information and second preset information determination conditions, or the value information and second preset information determination conditions, whether there is an obstacle in the candidate weeding region image. Specifically, a flowchart of the obstacle recognition method is as shown in FIG. 2:

Step 210: Determine a candidate obstacle region in a candidate weeding region image according to color information of the candidate weeding region image.

Step 220: Obtain contour information of the candidate obstacle region and value information of the candidate weeding region image, and obtain a minimum chrominance segmentation value and a maximum chrominance segmentation value of the candidate weeding region image according to the color information of the candidate weeding region image.

The contour information includes at least one of range information, roughness information, a proportion of lawn pixel points, and a proportion of chrominance effective pixels; and the value information includes the number of exposed pixels and/or the number of non-exposed white pixels.

A quantity of chrominance effective pixels is the number of pixels in an effective pixel value chrominance range in an obstacle region within the contour of the single candidate obstacle region. The proportion of chrominance effective pixels is a proportion of pixels in the effective pixel value chrominance range in the obstacle region within the contour of the single candidate obstacle region to all pixels within the contour.

An interval composed of the minimum chrominance segmentation value and the maximum chrominance segmentation value may be used as the effective pixel value chrominance range, and pixels with chrominances within the chrominance segmentation threshold interval are used as the chrominance effective pixels. The number of chrominance effective pixels in the obstacle region within the contour of the single candidate obstacle region is used as the number of chrominance effective pixels, and the proportion of chrominance effective pixels in the obstacle region within the contour of the single candidate obstacle region to all pixels within the contour is used as the proportion of chrominance effective pixels.

The proportion of lawn pixel points is a proportion of pixel points estimated to be of a lawn within the contour to all pixels. For example, if black pixel points are estimated to be lawn pixel points, the proportion of black pixel points to the whole is used as the proportion of lawn pixel points.

The minimum chrominance segmentation value and the maximum chrominance segmentation value of the candidate weeding region image may be obtained according to the color information of the candidate weeding region image through dynamic color segmentation, edge texture segmentation, fixed threshold segmentation, Otsu threshold segmentation, or the like. The minimum chrominance segmentation values and the maximum chrominance segmentation value of different candidate weeding region images may differ. The minimum chrominance segmentation value and the maximum chrominance segmentation value are used as the chrominance information of the candidate weeding region image.

The candidate weeding region image may be converted into a color segmentation image according to the chrominance segmentation threshold interval composed of the minimum chrominance segmentation value and the maximum chrominance segmentation value. For example, pixels with chrominances greater than or equal to the minimum chrominance segmentation value and less than or equal to the maximum chrominance segmentation value in the candidate weeding region image are converted into white, while other pixels are converted into black to obtain the color segmentation image.

The minimum chrominance segmentation value and the maximum chrominance segmentation value of the candidate weeding region image are obtained through the color information of the candidate weeding region image, and chrominance distribution of the candidate weeding region image is determined to determine, according to the chrominance information, whether there is an obstacle in the candidate weeding region image, so as to improve accuracy of recognizing obstacles having little color difference from the lawn.

Step 230: If the minimum chrominance segmentation value is less than a first preset chrominance segmentation threshold and the maximum chrominance segmentation value is greater than a second preset chrominance segmentation threshold, determine, according to the contour information and first preset information determination conditions, or the contour information, the value information, and first preset information determination conditions, whether there is an obstacle in the candidate weeding region image.

When the minimum chrominance segmentation value is less than the first preset chrominance segmentation threshold and the maximum chrominance segmentation value is greater than the second preset chrominance segmentation threshold, the chrominance segmentation threshold range is large. If only chrominance segmentation is used to recognize whether there is an obstacle, most regions of the candidate weeding region image may be recognized as lawns, resulting in a decrease in recognition accuracy.

The contour information of the candidate obstacle region is compared with the first preset information determination conditions, or the contour information and the value information are compared with the first preset information determination conditions, to determine whether there is an obstacle in the candidate weeding region image. For example, the first preset chrominance segmentation threshold is 20, and the second preset chrominance segmentation threshold is 90, which are not limited in this embodiment. The first preset information determination conditions may be adjusted according to specific determination scenarios, which is not limited in this embodiment.

Optionally, before the relationships between the minimum chrominance segmentation value and the maximum chrominance segmentation value of the candidate weeding region image corresponding to the candidate obstacle region and the thresholds are determined, the candidate obstacle region may be preliminarily determined through the contour information of the candidate obstacle region to avoid processing too far or too small candidate obstacle regions.

For example, the contour information of the candidate obstacle region includes position information and range information; the range information is a diagonal length $AContoursi.diagonal$ of the candidate obstacle region or a height $AContoursi.height$ of the candidate obstacle region, where i is a number of the candidate obstacle region; and the position information is a y-axis coordinate value $YContoursi$ at a bottom right corner of a minimum bounding rectangle of the candidate obstacle region, and a larger coordinate value indicates that the candidate obstacle region is closer to the robot. A diagonal threshold of a preset range threshold is 105, a height threshold is 70, and a preset position threshold is 75. When conditions $AContoursi.diagonal>105$ and $YContoursi>75$ or $AContoursi.height>70$ and $YContoursi>75$ are satisfied, the relationships between the minimum chrominance segmentation value and the maximum chrominance segmentation value of the candidate weeding region image corresponding to the candidate obstacle region and the thresholds are determined.

In this embodiment, optionally, the determining, according to the contour information and first preset information determination conditions, or the contour information, the value information, and first preset information determination conditions, whether there is an obstacle in the candidate weeding region image includes:

determining that there is an obstacle in the candidate weeding region image if the range information is less than a first preset range threshold, the proportion of lawn pixel points is less than a first preset lawn pixel point proportion threshold, and the roughness information is less than a first preset roughness threshold;

determining that there is an obstacle in the candidate weeding region image if the proportion of chrominance effective pixels is less than a first preset chrominance effective pixel proportion threshold, and the roughness information is less than a second preset roughness threshold;

determining that there is an obstacle in the candidate weeding region image if the number of exposed pixels is greater than a first preset exposed pixel number threshold, the number of non-exposed white pixels is greater than a first preset non-exposed white pixel threshold, the proportion of chrominance effective pixels is less than a second preset chrominance effective pixel proportion threshold, and the roughness information is less than a third preset roughness threshold; or determining that there is an obstacle in the candidate weeding region image if the range information is less than a second preset range threshold, the proportion of lawn pixel points is less than a second preset lawn pixel point proportion threshold, the roughness information is less than a fourth preset roughness threshold, the number of exposed pixels is greater than a second preset exposed pixel number threshold, and the number of non-exposed white pixels is greater than a second preset non-exposed white pixel threshold.

For example, the roughness information is an average roughness HContoursi of the contour of the candidate obstacle region. A smaller average roughness indicates a smoother candidate obstacle region. The range information is about the number of pixels AContoursi. Pixels and the proportion of lawn pixel points BContoursi in the candidate obstacle region. The number of chrominance effective pixels is SContoursi, where i is a number of the candidate obstacle region. The proportion of chrominance effective pixels is SPContoursi.

For example, if the first preset range threshold is 900, the first preset lawn pixel point proportion threshold is 0.001, and the first preset roughness threshold is the first preset information determination conditions are AContoursi.pixels<900, BContoursi<0.001, and HContoursi<0.27, and when the conditions are satisfied, it is determined that there is an obstacle in the candidate weeding region image, where the obstacle may be a barbed wire separating the lawn.

For example, if the first preset chrominance effective pixel proportion threshold is 0.2 and the second preset roughness threshold is 0.251, the first preset information determination conditions are SPContoursi<0.2 and HContoursi<0.251, and when the conditions are satisfied, it is determined that there is an obstacle in the candidate weeding region image, where the obstacle may be a rusty pillar surrounded by the lawn. If the first preset chrominance effective pixel proportion threshold is 0.14 and the second preset roughness threshold is 0.27, the first preset information determination conditions are SPContoursi<0.14 and HContoursi<0.27, and when the conditions are satisfied, it is determined that there is an obstacle in the candidate weeding region image, where the obstacle may be a flower bed boundary.

For example, the number of exposed pixels is denoted as overbrightPix, and the number of non-exposed white pixels is denoted as zeroPix. If the first preset exposed pixel number threshold is 100, the first preset non-exposed white pixel threshold is 50, the second preset chrominance effective pixel proportion threshold is 0.5, and the third preset roughness threshold is 0.28, the first preset information determination conditions are overbrightPix>100, zeroPix>50, SPContoursi<0.5, and HContoursi<0.28, and when the conditions are satisfied, it is determined that there is an obstacle in the candidate weeding region image.

For example, if the second preset range threshold is 2600, the second preset lawn pixel point proportion threshold is 0.001, the fourth preset roughness threshold is 0.18, the second preset exposed pixel number threshold is 100, and the second preset non-exposed white pixel threshold is 10, the first preset information determination conditions are AContoursi.pixels<2600, BContoursi<0.001, HContoursi<0.18, overrightPix>100, and zeroPix>10, and when the conditions are satisfied, it is determined that there is an obstacle in the candidate weeding region image.

Step 240: If the minimum chrominance segmentation value is greater than or equal to the first preset chrominance segmentation threshold or the maximum chrominance segmentation value is less than or equal to the second preset chrominance segmentation threshold, determine, according to the contour information and second preset information determination conditions, or the value information and second preset information determination conditions, whether there is an obstacle in the candidate weeding region image.

When the minimum chrominance segmentation value is greater than or equal to the first preset chrominance segmentation threshold, and the maximum chrominance segmentation value is less than or equal to the second preset chrominance segmentation threshold, the contour information of the candidate obstacle region is compared with the second preset information determination conditions, or the value information is compared with the second preset information determination conditions, to determine whether there is an obstacle in the candidate weeding region image.

The second preset information determination conditions may be adjusted according to specific determination scenarios, which is not limited in this embodiment.

In this embodiment, optionally, the determining, according to the contour information and second preset information determination conditions, or the value information and second preset information determination conditions, whether there is an obstacle in the candidate weeding region image includes:

determining that there is an obstacle in the candidate weeding region image if the roughness information is less than a fifth preset roughness threshold;

determining that there is an obstacle in the candidate weeding region image if the number of exposed pixels is greater than a third preset exposed pixel number threshold; or determining that there is an obstacle in the candidate weeding region image if the number of exposed pixels is greater than a fourth preset exposed pixel number threshold, and the number of non-exposed white pixels is greater than a third preset non-exposed white pixel threshold.

For example, if the fifth preset roughness threshold is 0.25, the second preset information determination condition is HContoursi<0.26, and when the condition is satisfied, it is determined that there is an obstacle in the candidate weeding region image.

For example, if the third preset exposed pixel number threshold is 100, the second preset information determination condition is overbrightPix>100, and when the condition is satisfied, it is determined that there is an obstacle in the candidate weeding region image.

For example, if the fourth preset exposed pixel number threshold is 20 and the third preset non-exposed white pixel threshold is 10, the second preset information determination conditions are overrightPix>20 and zeroPix>10, and when the conditions are satisfied, it is determined that there is an obstacle in the candidate weeding region image.

In the embodiment of the present invention, whether there is an obstacle in the candidate weeding region image is determined through the minimum chrominance segmentation value, the maximum chrominance segmentation value, the contour information, the chrominance information, and the value information, to improve accuracy of obstacle recognition in candidate weeding region image when expected effects are not achieved in recognition of obstacles solely based on chrominance segmentation due to a large chrominance segmentation value range or unclear chrominance differentiation between a lawn and a non-lawn region.

Embodiment 3

FIG. 3 is a schematic structural diagram of an obstacle recognition apparatus provided in Embodiment 3 of the present invention. The apparatus may be implemented by hardware and/or software, may perform the obstacle recognition method provided in any embodiment of the present invention, and has corresponding functional modules and beneficial effects for performing the method. As shown in FIG. 3, the apparatus includes:

a candidate obstacle region determination module 310, configured to determine a candidate obstacle region in a candidate weeding region image according to color information of the candidate weeding region image;

an information obtaining module 320, configured to obtain contour information of the candidate obstacle region and chrominance information and value information of the candidate weeding region image; and an obstacle determination module 330, configured to determine, according to the contour information and the chrominance information, or the contour information, the chrominance information, and the value information, whether there is an obstacle in the candidate weeding region image.

According to the technical solution provided in this embodiment, a candidate obstacle region in a candidate weeding region image is determined according to color information of the candidate weeding region image; contour information of the candidate obstacle region and chrominance information and value information of the candidate weeding region image are obtained; and whether there is an obstacle in the candidate weeding region image is determined according to the contour information and the chrominance information, or the contour information, the chrominance information, and the value information. Thus, problems in existing technologies that boundary wires are generally buried to calibrate a boundary of a weeding region for a weeding robot and consequently a lot of manpower and material resources are consumed and costs are increased are solved. In addition, a problem that a shape of the weeding region is limited to some extent due to limitations on the burying of boundary wires is solved. The present invention improves recognition efficiency and accuracy of obstacles in the candidate weeding region for the weeding robot.

On the basis of the foregoing technical solutions, optionally, the candidate obstacle region determination module includes:

a color segmentation image obtaining unit, configured to obtain a color segmentation image of the candidate weeding region image according to the color information of the candidate weeding region image; and a candidate obstacle region determination unit, configured to morphologically process the color segmentation image, and determine a region with a preset color as the candidate obstacle region from the morphologically processed color segmentation image.

On the basis of the foregoing technical solutions, optionally, the information obtaining module includes:

a chrominance segmentation value obtaining unit, configured to obtain a minimum chrominance segmentation value and a maximum chrominance segmentation value of the candidate weeding region image according to the color information of the candidate weeding region image.

On the basis of the foregoing technical solutions, optionally, the contour information includes at least one of range information, roughness information, a proportion of lawn pixel points, and a proportion of chrominance effective pixels; and the value information includes the number of exposed pixels and/or the number of non-exposed white pixels.

The obstacle determination module includes:

a first obstacle determination unit, configured to, if a minimum chrominance segmentation value is less than a first preset chrominance segmentation threshold and a maximum chrominance segmentation value is greater than a second preset chrominance segmentation threshold, determine, according to the contour information and first preset information determination conditions, or the contour information, the value information, and first preset information determination conditions, whether there is an obstacle in the candidate weeding region image; or a second obstacle determination unit, configured to, if the minimum chrominance segmentation value is greater than or equal to the first preset chrominance segmentation threshold or the maximum chrominance segmentation value is less than or equal to the second preset chrominance segmentation threshold, determine, according to the contour information and second preset information determination conditions, or the value information and second preset information determination conditions, whether there is an obstacle in the candidate weeding region image.

On the basis of the foregoing technical solutions, optionally, the first obstacle determination unit includes:

a first obstacle determination subunit, configured to determine that there is an obstacle in the candidate weeding region image if the range information is less than a first preset range threshold, the proportion of lawn pixel points is less than a first preset lawn pixel point proportion threshold, and the roughness information is less than a first preset roughness threshold;

a second obstacle determination subunit, configured to determine that there is an obstacle in the candidate weeding region image if the proportion of chrominance effective pixels is less than a first preset chrominance effective pixel proportion threshold, and the roughness information is less than a second preset roughness threshold;

a third obstacle determination subunit, configured to determine that there is an obstacle in the candidate weeding region image if the number of exposed pixels is greater than a first preset exposed pixel number threshold, the number of non-exposed white pixels is greater than a first preset non-exposed white pixel threshold, the proportion of chrominance effective pixels is less than a second preset chrominance effective pixel proportion threshold, and the roughness information is less than a third preset roughness threshold; or a fourth obstacle determination subunit, configured to determine that there is an obstacle in the candidate weeding region image if the range information is less than a second preset range threshold, the proportion of lawn pixel points is less than a second preset lawn pixel point proportion threshold, the roughness information is less than a fourth preset roughness threshold, the number of exposed pixels is greater than a second preset exposed pixel number threshold, and the number of non-exposed white pixels is greater than a second preset non-exposed white pixel threshold.

On the basis of the foregoing technical solutions, optionally, the second obstacle determination unit includes:

a fifth obstacle determination subunit, configured to determine that there is an obstacle in the candidate weeding region image if the roughness information is less than a fifth preset roughness threshold;

a sixth obstacle determination subunit, configured to determine that there is an obstacle in the candidate weeding region image if the number of exposed pixels is greater than a third preset exposed pixel number threshold; or a seventh obstacle determination subunit, configured to determine that there is an obstacle in the candidate weeding region image if the number of exposed pixels is greater than a fourth preset exposed pixel number threshold, and the number of non-exposed white pixels is greater than a third preset non-exposed white pixel threshold.

Embodiment 4

Figure 4:
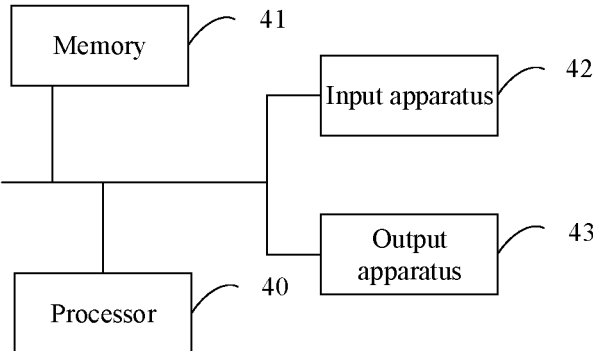
FIG. 4 is a schematic structural diagram of an electronic device provided in Embodiment 4 of the present invention.

FIG. 4 is a schematic structural diagram of an electronic device provided in Embodiment 4 of the present invention. As shown in FIG. 4, the electronic device includes a processor 40, a memory 41, an input apparatus 42, and an output apparatus 43. One or more processors 40 may be provided in the electronic device, and one processor 40 is used as an example in FIG. 4. The processor 40, the memory 41, the input apparatus 42, and the output apparatus 43 in the electronic device may be connected through a bus or in other ways, and they are connected through a bus as an example in FIG. 4.

As a computer-readable storage medium, the memory 41 may be used to store a software program, a computer executable program, and modules, such as program instructions/modules corresponding to the obstacle recognition method in the embodiments of the present invention. The processor 40 executes various functional applications and data processing of the electronic device by running the software program, instructions, and modules stored in the memory 41, to implement the foregoing obstacle recognition method.

The memory 41 may mainly include a program storage region and a data storage region, where the program storage region may store an operating system, and an application program required for at least one function; and the data storage region may store data created according to use of a terminal, and the like. In addition, the memory 41 may include a high speed random access memory, and may alternatively include a non-volatile memory, such as at least one of a magnetic disk storage device, a flash memory, or other non-volatile solid-state storage device. In some examples, the memory 41 may further include memories arranged remotely from the processor 40, and these remote memories may be connected to the electronic device through a network. Embodiments of the network include, but are not limited to, the Internet, an intranet, a local area network, a mobile communications network, or a combination thereof.

Embodiment 5

Embodiment 5 of the present invention further provides a storage medium including computer-executable instructions. The computer-executable instructions are used to execute an obstacle recognition method when being executed by a computer processor, the method including:

determining a candidate obstacle region in a candidate weeding region image according to color information of the candidate weeding region image;

obtaining contour information of the candidate obstacle region and chrominance information and value information of the candidate weeding region image; and determining, according to the contour information and the chrominance information, or the contour information, the chrominance information, and the value information, whether there is an obstacle in the candidate weeding region image.

The computer-executable instructions included in the storage medium provided in the embodiment of the present invention are not limited to the foregoing method operations, but may also execute related operations in the obstacle recognition method provided in any embodiment of the present invention.

From the above description of the embodiments, those skilled in the art may clearly understand that the present invention may be implemented by means of software and necessary general-purpose hardware, and may alternatively be implemented by hardware, but in many cases the former is better. Based on such an understanding, the technical solution of the present invention substantially, or the part of the present invention making contribution to the prior art may be embodied in the form of a software product, and the computer software product may be stored in a computer-readable storage medium, such as a floppy disk of a computer, a read-only memory (ROM), a random access memory (RAM), a flash, a hard disk or a CD, including a number of instructions enabling a computer device (which may be a personal computer, a server, or a network communication device) to execute the method described in each embodiment of the present invention.

It is worth noting that, in the embodiment of the foregoing obstacle recognition apparatus, the included units and modules are merely divided according to functional logics, but are not limited to the foregoing division, as long as the corresponding functions can be realized. In addition, the specific names of the functional units are merely for the convenience of distinguishing from each other, and are not used to limit the protection scope of the present invention.

Embodiment 6

Embodiment 6 of the present invention provides a weeding robot, including a robot body and the electronic device as described in any embodiment of the present invention.

Specifically, the electronic device installed on the weeding robot may perform related operations of the obstacle recognition method described in any embodiment of the present invention.

The robot body may include a left active driving wheel and a right active driving wheel, which may be driven by a motor respectively. The motor may be a brushless motor with a gearbox and a Hall sensor. The robot body controls the speed and direction of the two active driving wheels to achieve forward, backward, turning, and arc driving operations. The robot body further includes a universal wheel, a camera, and a rechargeable battery, among which the universal wheel plays a supporting and balancing role. The camera is installed at a designated position of the robot at a preset angle to the horizontal direction to capture a candidate weeding region image. The rechargeable battery is used to provide power for the robot to work.

It should be noted that the foregoing descriptions are merely preferred embodiments of the present invention and applied technical principles. Those skilled in the art will understand that the present invention is not limited to the specific embodiments described herein, and various obvious changes, readjustments and substitutions can be made by those skilled in the art without departing from the protection scope of the present invention. Therefore, although the present invention is described in detail through the above embodiments, the present invention is not limited to the above embodiments, and may further include more other equivalent embodiments without departing from the concept of the present invention. The scope of the present invention is determined by the scope of the appended claims.

The invention claimed is:

1. A method for recognizing an obstacle in a lawn so that a weeding robot working in the lawn can selectively avoid the obstacle, the method comprising the steps of:

determining a candidate obstacle region in a candidate weeding region image according to color information of the candidate weeding region image;

obtaining contour information of the candidate obstacle region and chrominance information and value information of the candidate weeding region image; and determining, according to the contour information and the chrominance information, or the contour information, the chrominance information, and the value information, whether there is an obstacle in the candidate weeding region image so that the weeding robot can be driven accordingly, wherein the step of obtaining chrominance information of the candidate weeding region image comprises:

obtaining a minimum chrominance segmentation value and a maximum chrominance segmentation value of the candidate weeding region image according to the color information of the candidate weeding region image, and wherein the contour information comprises at least one of range information, roughness information, a proportion of lawn pixel points, and a proportion of chrominance effective pixels;

the value information comprises at least one of a number of exposed pixels and a number of non-exposed white pixels; and the determining, according to the contour information and the chrominance information, or the contour information, the chrominance information, and the value information, whether there is an obstacle in the candidate weeding region image comprises:

if the minimum chrominance segmentation value is less than a first preset chrominance segmentation threshold and the maximum chrominance segmentation value is greater than a second preset chrominance segmentation threshold, determining, according to the contour information and first preset information determination conditions, or the contour information, the value information, and first preset information determination conditions, whether there is an obstacle in the candidate weeding region image; or if the minimum chrominance segmentation value is greater than or equal to the first preset chrominance segmentation threshold or the maximum chrominance segmentation value is less than or equal to the second preset chrominance segmentation threshold, determining, according to the contour information and second preset information determination conditions, or the value information and second preset information determination conditions, whether there is an obstacle in the candidate weeding region image, and wherein the step of determining, according to the contour information and first preset information determination conditions, or the contour information, the value information, and first preset information determination conditions, whether there is an obstacle in the candidate weeding region image comprises:

determining that there is an obstacle in the candidate weeding region image if the range information is less than a first preset range threshold, the proportion of lawn pixel points is less than a first preset lawn pixel point proportion threshold, and the roughness information is less than a first preset roughness threshold;

determining that there is an obstacle in the candidate weeding region image if the proportion of chrominance effective pixels is less than a first preset chrominance effective pixel proportion threshold, and the roughness information is less than a second preset roughness threshold;

determining that there is an obstacle in the candidate weeding region image if the number of exposed pixels is greater than a first preset exposed pixel number threshold, the number of non-exposed white pixels is greater than a first preset non-exposed white pixel threshold, the proportion of chrominance effective pixels is less than a second preset chrominance effective pixel proportion threshold, and the roughness information is less than a third preset roughness threshold; or determining that there is an obstacle in the candidate weeding region image if the range information is less than a second preset range threshold, the proportion of lawn pixel points is less than a second preset lawn pixel point proportion threshold, the roughness information is less than a fourth preset roughness threshold, the number of exposed pixels is greater than a second preset exposed pixel number threshold, and the number of non-exposed white pixels is greater than a second preset non-exposed white pixel threshold.

2. The method according to claim 1, wherein the step of determining a candidate obstacle region in a candidate weeding region image according to color information of the candidate weeding region image comprises:

obtaining a color segmentation image of the candidate weeding region image according to the color information of the candidate weeding region image; and morphologically processing the color segmentation image, and determining a region with a preset color as the candidate obstacle region from the morphologically processed color segmentation image.

3. The method according to claim 1, wherein the step of determining, according to the contour information and second preset information determination conditions, or the value information and second preset information determination conditions, whether there is an obstacle in the candidate weeding region image comprises:

determining that there is an obstacle in the candidate weeding region image if the roughness information is less than a fifth preset roughness threshold;

determining that there is an obstacle in the candidate weeding region image if the number of exposed pixels is greater than a third preset exposed pixel number threshold; or determining that there is an obstacle in the candidate weeding region image if the number of exposed pixels is greater than a fourth preset exposed pixel number threshold, and the number of non-exposed white pixels is greater than a third preset non-exposed white pixel threshold.

4. An electronic device comprising:

one or more processors; and a storage apparatus configured to store one or more programs, wherein when the one or more programs are executed by the one or more processors, the one or more processors are enabled to implement the method according to claim 1.

5. A non-transitory computer-readable storage medium storing a computer program, wherein when the computer program is executed by a processor, the method according to claim 1 is implemented.

6. A weeding robot comprising a robot body and the electronic device according to claim 4.

7. A method for recognizing an obstacle in a lawn so that a weeding robot working in the lawn can selectively avoid the obstacle, the method comprising the steps of:

determining a candidate obstacle region in a candidate weeding region image according to color information of the candidate weeding region image;

obtaining contour information of the candidate obstacle region and chrominance information and value information of the candidate weeding region image; and determining, according to the contour information and the chrominance information, or the contour information, the chrominance information, and the value information, whether there is an obstacle in the candidate weeding region image so that the weeding robot can be driven accordingly, wherein the step of obtaining chrominance information of the candidate weeding region image comprises:

obtaining a minimum chrominance segmentation value and a maximum chrominance segmentation value of the candidate weeding region image according to the color information of the candidate weeding region image, and wherein the contour information comprises at least one of range information, roughness information, a proportion of lawn pixel points, and a proportion of chrominance effective pixels;

the value information comprises at least one of a number of exposed pixels and a number of non-exposed white pixels; and the determining, according to the contour information and the chrominance information, or the contour information, the chrominance information, and the value information, whether there is an obstacle in the candidate weeding region image comprises:

if the minimum chrominance segmentation value is less than a first preset chrominance segmentation threshold and the maximum chrominance segmentation value is greater than a second preset chrominance segmentation threshold, determining, according to the contour information and first preset information determination conditions, or the contour information, the value information, and first preset information determination conditions, whether there is an obstacle in the candidate weeding region image; or if the minimum chrominance segmentation value is greater than or equal to the first preset chrominance segmentation threshold or the maximum chrominance segmentation value is less than or equal to the second preset chrominance segmentation threshold, determining, according to the contour information and second preset information determination conditions, or the value information and second preset information determination conditions, whether there is an obstacle in the candidate weeding region image, and wherein the step of determining, according to the contour information and second preset information determination conditions, or the value information and second preset information determination conditions, whether there is an obstacle in the candidate weeding region image comprises:

determining that there is an obstacle in the candidate weeding region image if the roughness information is less than a fifth preset roughness threshold;

determining that there is an obstacle in the candidate weeding region image if the number of exposed pixels is greater than a third preset exposed pixel number threshold; or determining that there is an obstacle in the candidate weeding region image if the number of exposed pixels is greater than a fourth preset exposed pixel number threshold, and the number of non-exposed white pixels is greater than a third preset non-exposed white pixel threshold.

* * * * *